US012710146B2

(12) United States Patent
McFarland et al.

(10) Patent No.: US 12,710,146 B2
(45) Date of Patent: Aug. 18, 2026

(54) MODULAR LED LIGHTING DEVICES AND SYSTEMS WITH OBLIQUE EDGE DIFFUSION PANEL

(71) Applicants: Logan McFarland, Aventura, FL (US); Al Jester Dela Cruz, Valley Village, CA (US)

(72) Inventors: Logan McFarland, Aventura, FL (US); Al Jester Dela Cruz, Valley Village, CA (US)

( * ) Notice: Subject to any disclaimer, the term of this patent is extended or adjusted under 35 U.S.C. 154(b) by 0 days.

(21) Appl. No.: 19/022,870

(22) Filed: Jan. 15, 2025

(65) Prior Publication Data

US 2026/0202023 A1 Jul. 16, 2026

(51) Int. Cl.

*F21S 2/00* (2016.01)
*F21V 5/00* (2018.01)
*F21V 8/00* (2006.01)
*F21V 17/12* (2006.01)
*F21Y 107/90* (2016.01)
*F21Y 113/00* (2016.01)
*F21Y 115/10* (2016.01)

(52) U.S. Cl.

CPC .............. *F21S 2/005* (2013.01); *F21V 5/002* (2013.01); *F21V 17/12* (2013.01); *G02B 6/0021* (2013.01); *G02B 6/0078* (2013.01); *G02B 6/008* (2013.01); *F21Y 2107/90* (2016.08); *F21Y 2113/00* (2013.01); *F21Y 2115/10* (2016.08)

(58) Field of Classification Search

CPC .......... F21S 2/005; F21V 5/002; F21V 17/12; G02B 6/0021; G02B 6/0078; G02B 6/008

See application file for complete search history.

(56) References Cited

U.S. PATENT DOCUMENTS 8,915,637 B2 * 12/2014 Yang .................... G02B 6/0011 362/97.1
2009/0030410 A1 1/2009 Auge et al.
2009/0290093 A1 * 11/2009 Shimura ........... G02F 1/133606 362/613
2009/0303410 A1 * 12/2009 Murata .................. G02B 6/002 349/65

(Continued)

OTHER PUBLICATIONS

International Search Report and Written Opinion, PCT/US2026/011307, 11 pages.

*Primary Examiner* — Tracie Y Green
*Assistant Examiner* — Michael Chiang
(74) *Attorney, Agent, or Firm* — Foley & Lardner LLP

(57) ABSTRACT

A lighting system has a plurality of lighting device modules. Each lighting device module includes a light diffusion panel having a primary light emitting surface and two parallel, opposite-facing side edge surfaces, where each side edge surface defines a plane at an oblique angle relative to the primary light emitting surface. A plurality of light emitting diodes (LEDs) are arranged to emit light into the light diffusion panel, for emitting light from the light emitting surface of the light diffusion panel. The lighting device modules are arranged adjacent each other, with at least one of the two angled side edge surfaces of the light diffusion panel of each lighting device module arranged adjacent to and overlapping one of the two angled side edge surfaces of the light diffusion panel of another one of the lighting device modules.

20 Claims, 5 Drawing Sheets

(56) References Cited

U.S. PATENT DOCUMENTS

| | | | | |
|---|---|---|---|---|
| 2011/0038178 | A1* | 2/2011 | Kuwayama | G02B 6/0078 362/616 |
| 2011/0050557 | A1* | 3/2011 | Hur | G02B 6/008 345/102 |
| 2012/0134179 | A1* | 5/2012 | Que | G02B 6/0045 362/616 |
| 2013/0135843 | A1* | 5/2013 | Chen | G02B 6/008 362/343 |
| 2016/0170132 | A1* | 6/2016 | Sugimoto | G02B 6/0078 362/611 |
| 2017/0322364 | A1* | 11/2017 | Girotto | F21V 23/0485 |
| 2020/0408980 | A1* | 12/2020 | Liu | G02B 6/005 |

* cited by examiner

MODULAR LED LIGHTING DEVICES AND SYSTEMS WITH OBLIQUE EDGE DIFFUSION PANEL

BACKGROUND

Lighting devices and systems are used for a variety of purposes, including but not limited to general illumination of public or private areas, safety lighting, workplace lighting, combinations thereof, and the like. Lighting devices that have a decorative or artistic visual effect are popular in homes, office buildings, hotels and other locations, and are used in indoor and outdoor settings.

Modern lighting devices and systems often include one or more light emitting diodes (LEDs). However, the shape and design of conventional lighting systems can be limited by the standard shape of available components, or by the manufacturing costs and complexity of making custom-shaped components. In addition, typical modern LED lighting devices, if arranged side-by-side in a lighting system, can exhibit a visible gap in illumination effect between adjacent devices.

Accordingly, example embodiments described herein relate to lighting devices or modules that are configured to be arranged (connected or abutted) together to form lighting systems having various shapes or designs, and that minimize or avoid a visible gap in illumination between adjacent lighting device modules in the lighting system. A system composed of multiple lighting device modules as described herein can provide a pleasing visual lighting effect, with minimal or no visible gaps in the light emission between adjacent lighting device modules. Also, particular example embodiments are configured to simplify manufacturing complexity and costs, and to enable significant flexibility and options in the design and shape of lighting systems.

The above information disclosed in this Background section is for enhancement of understanding of the background of the invention, and contains information that does not constitute prior art.

SUMMARY

One or more examples and aspects described herein relate to a lighting device having at least one lighting device module. In certain examples described herein, Each lighting device module includes a light diffusion panel having a primary light emitting surface and at least one side edge defining a plane at an oblique angle relative to the primary light emitting surface. Each lighting device module also includes a plurality of light emitting diodes (LEDs) arranged to emit light into the light diffusion panel, for emitting light from the light emitting surface of the light diffusion panel.

In further examples, the at least one lighting device module includes a plurality of lighting device modules arranged with the at least one side edge of the light diffusion panel of one of the lighting device modules arranged adjacent to and overlapping the at least one side edge of the light diffusion panel of at least one other of the lighting device modules of the plurality of lighting device modules.

In further examples, each lighting device has a lengthwise dimension and is configured to be arranged adjacent another one of the lighting device modules of the plurality of lighting device modules with their respective length dimensions extending in a linear line, and to be rotated 180 degrees and arranged adjacent the same other lighting device module with their respective length dimensions extending perpendicular to each other.

In certain examples, the oblique angle is a 45 degree angle.

In certain examples, the plurality of LEDs are on a LED strip light.

In further examples, the light diffusion panel has a channel in which the LED strip light is received.

In further examples, the channel has an outer wall and the plurality of LEDs on the LED strip light are arranged to face and emit light into the outer wall of the channel.

Additional examples, further include a cover panel arranged to cover a portion of, but not the entire primary light emitting surface of the light diffusion panel, wherein the cover panel covers the channel in the light diffusion panel.

Additional examples, further include a housing fixed on a surface of the light diffusion panel opposite of the primary light emitting surface, and a bracket assembly connected to the housing for mounting the housing to a mounting surface.

Additional examples, further include one or more threaded fasteners extending through a portion of the housing and through the light diffusion panel, and a cover panel arranged to cover a portion of, but not the entire primary light emitting surface of the light diffusion panel, wherein the cover has one or more threaded openings for receiving the one or more threaded fasteners, to couple the housing, the light diffusion panel and the cover panel together.

In further embodiments of the above examples, the cover panel includes one or more projections corresponding in number to the one or more threaded openings, wherein each respective threaded opening is in a respective one of the projections.

In further embodiments of the above examples, the projections extends at least partially into a respective opening in the light diffusion panel.

In further embodiments of the above examples, the light diffusion panel has a main channel in the primary light emitting surface, the main channel extending along at least a portion of, and spaced inward from a perimeter of the light diffusion panel, and the LEDs are located within the main channel and arranged to face and emit light toward at least a portion of the perimeter of the light diffusion panel.

In further embodiments of the above examples, the light diffusion panel has an opening extending through the light diffusion panel, and wherein the lighting system further includes at least one electrical conductor electrically coupled to the LEDs and extending through the opening in the light diffusion panel.

In further embodiments of the above examples, the light diffusion panel has a connector channel extending from the main channel to the opening.

Yet further examples relate to a lighting system including a plurality of lighting device modules, where each lighting device module includes a light diffusion panel having a primary light emitting surface and two parallel, opposite-facing side edge surfaces, each side edge surface defining a plane at an oblique angle relative to the primary light emitting surface. These further examples, also include a plurality of light emitting diodes (LEDs) arranged to emit light into the light diffusion panel, for emitting light from the light emitting surface of the light diffusion panel, wherein the plurality of lighting device modules are arranged adjacent each other, with at least one of the two side edge surfaces of the light diffusion panel of each lighting device module arranged adjacent to and overlapping one of the two side edge surfaces of the light diffusion panel of another one of the lighting device modules in the plurality of lighting device modules.

In additional embodiments of the above yet further examples, the light diffusion panel of each lighting device module has a generally rectangular shape defining a lengthwise dimension and a widthwise dimension, and wherein the side edge surfaces defining the oblique angle extend along the widthwise dimension.

In additional embodiments of the above yet further examples, each lighting device module is arranged adjacent one or two of the other lighting device modules of the plurality of lighting device modules with each of their respective length dimensions extending in a linear line, and to be rotated 180 degrees and arranged adjacent the same one or two other lighting device modules with its length dimensions extending perpendicular to the length dimension of the one or two other lighting device modules.

In additional embodiments of the above yet further examples, the plurality of LEDs are on an LED strip light, the light diffusion panel has a channel in which the LED strip light is received, and the channel has an outer wall and wherein the plurality of LEDs on the LED strip light are arranged to face and emit light into the outer wall of the channel.

Additional embodiments of the above yet further examples, include a cover panel arranged to cover a portion of, but not the entire primary light emitting surface of the light diffusion panel, wherein the cover panel covers the channel in the light diffusion panel.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1:
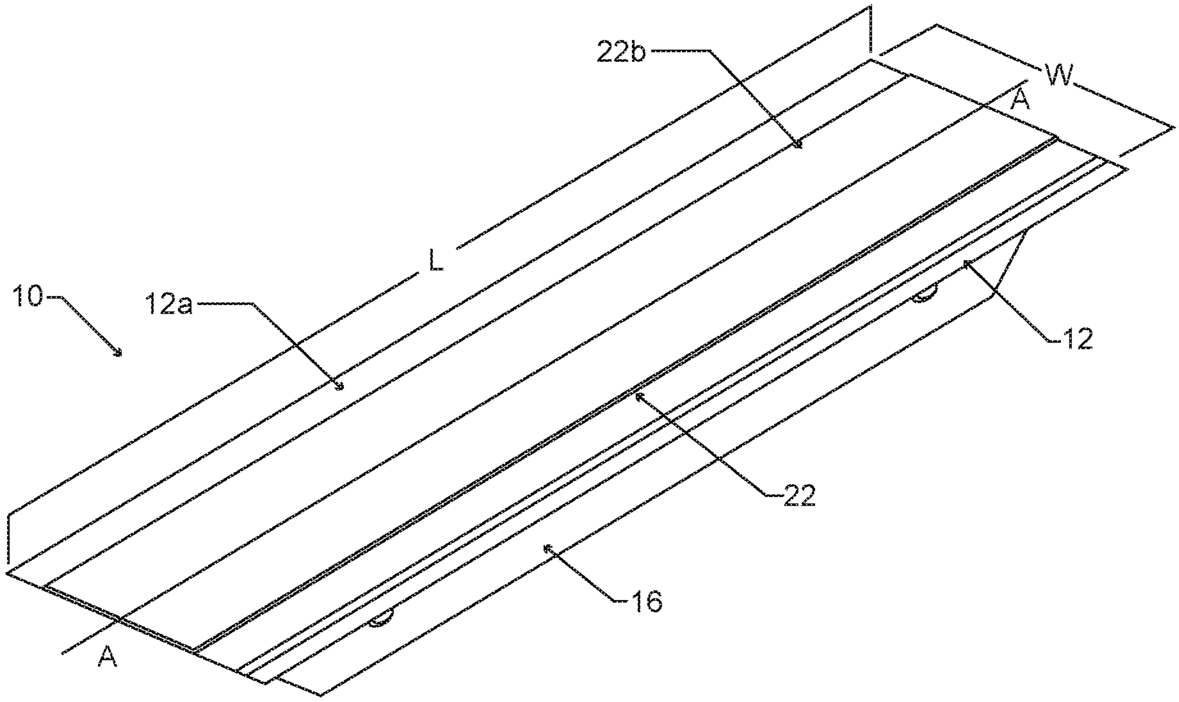
FIG. 1 is a perspective view of a lighting device module according to an example embodiment.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The present disclosure relates to lighting device modules, and to lighting systems that include one or more (or a plurality of) lighting device modules, configured as described herein. In some example embodiments, the lighting device module is configured to be cut to a desired length or width dimension (or both), such that a lighting system may include a number N of lighting device modules, where Nis any suitable number 1, 2, 3, 4 . . . of lighting device modules, and may include a fraction of one or more of the lighting device modules. Lighting device modules and systems as described herein may be operated for use in a variety of contexts, such as, but not limited to, outdoor or indoor decorative lighting, safety lighting, workplace lighting, or other specific or general illumination use. A lighting device system composed of a plurality of lighting device modules arranged and operated together may provide functional and aesthetically pleasing illumination for any of, or a variety of those or other contexts of use.

Figure 2:
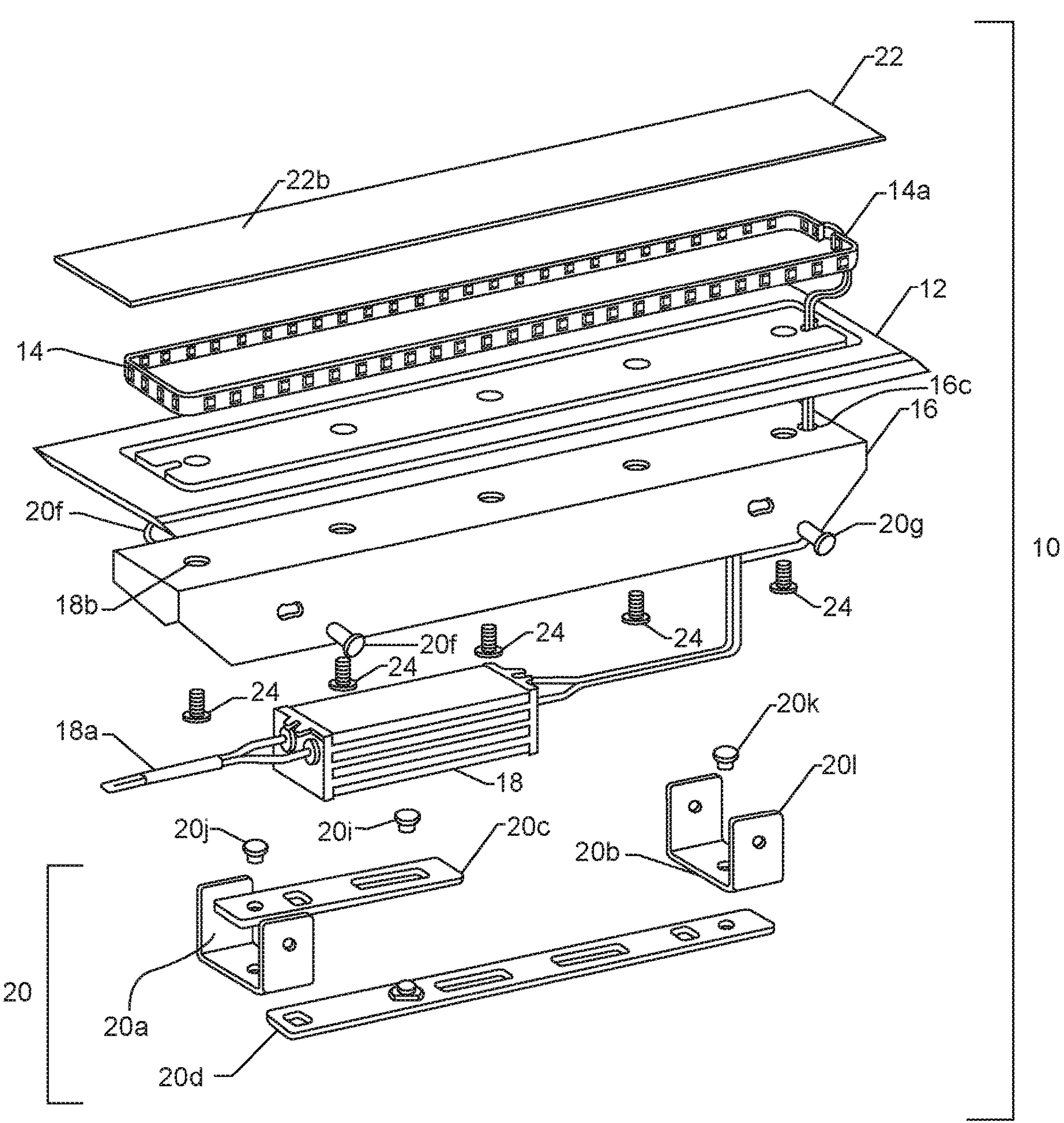
FIG. 2 is an exploded view of the lighting device module of FIG. 1.

A single lighting device module 10, according to an example embodiment, is shown in FIGS. 1 and 2. The lighting device module 10 is shown in an assembled state in FIG. 1, and is shown in an exploded view state in FIG. 2. The lighting device module 10 may be used individually, or, with a plurality of other lighting device modules arranged together (or arranged and connected together) as described herein.

In particular examples, the lighting device module 10 has one or more edges (two edges in the illustrated example) that are cut or otherwise formed at an oblique angle and are configured to be arranged directly adjacent (close to or in abutment) with an angled edge of another lighting device module in a lighting system. The angled edges of adjacent lighting device modules are parallel and overlap each other, and can emit light to minimize or eliminate a visible gap in light emission between adjacent lighting device modules in the system. Accordingly, a system of multiple lighting device modules can provide a pleasing visual lighting effect, with minimal or no visible gaps in the light emission between adjacent lighting device modules in the system.

The lighting device module 10 includes a light diffusion panel 12, an LED strip light 14, an electronics housing 16, an electronics component 18, a bracket assembly 20, and a cover panel 22 that connect together, generally as shown in FIG. 2. The LED strip light 14 assembles with the light diffusion panel 12, as described below with reference to FIGS. 3*a* and 3*b*. The light diffusion panel 12 and the cover panel 22 couple to a flat housing wall surface 16*a* of the housing 16 (i.e., the wall surface defining the upward-facing surface of the housing 16 in FIG. 2). The housing 16 holds the electronics component 18 and the bracket assembly 20, as described below.

Figures 3A, 3B:
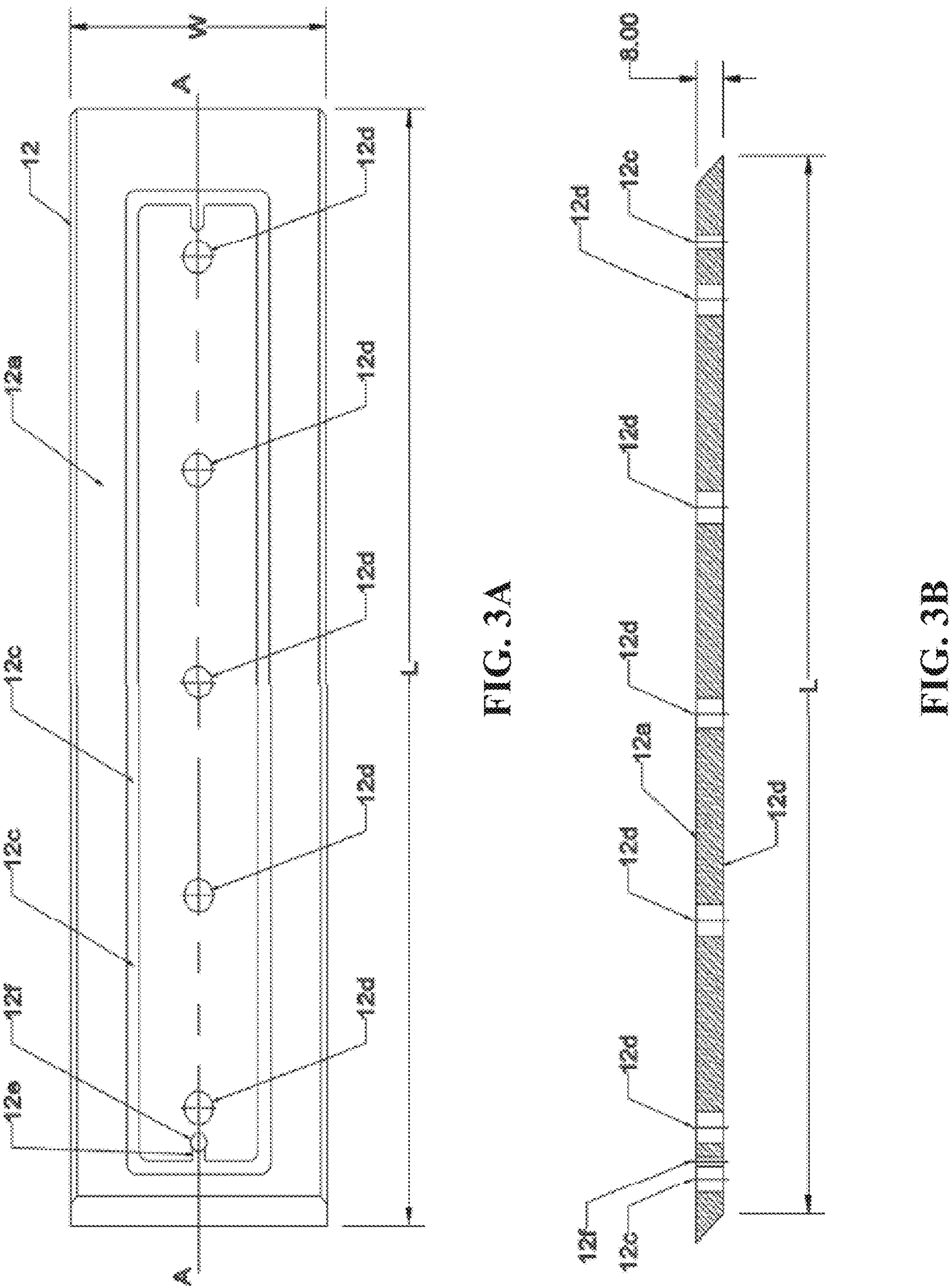
FIG. 3*a* is a top-down view of a light diffusion panel of the lighting device module of FIGS. 1 and 2.
FIG. 3*b* is a cross-section view of the light diffusion panel of FIG. 3*a*, taken along the axis A.

An example of a light diffusion panel 12 is shown in FIGS. 3*a* and 3*b*. The light diffusion panel 12 has a first primary surface 12*a* (the upward-facing surface in FIGS. 1, 2, 3*a* and 3*b*) that defines the primary light emitting surface of the lighting device module 10. FIG. 3*a* shows a top-down view of the primary light emitting surface 12*a* of the light diffusion panel 12, and FIG. 3*b* shows a cross-section view of the light diffusion panel 12 taken along the axis A.

As described below, the light diffusion panel 12 has a second primary surface 12*b* (the downward-facing surface in FIGS. 1, 2, 3*a* and 3*b*) that may be generally flat for abutting against the flat wall surface 16*a* of the electronics housing 16. Also as described below, the light diffusion panel includes a groove or channel 12*c* in the first primary surface 12*a*, for receiving the LED strip light 14. In other examples, the groove or channel 12*c* may be in the second primary surface 12*b*.

When the lighting device module 10 is assembled as shown in FIG. 1 and is connected to a source of electrical power for operation, light is emitted from the primary light emitting surface 12*a* (or at least a peripheral edge section of the primary light emitting surface 12*a*), to provide illumination, a visual effect, or both. In certain examples, the cover panel 22 is arranged to cover a portion, but not all of the primary light emitting surface 12*a* of the light diffusion panel 12, to cover fastener openings and the groove or channel 12*c* in the light diffusion panel 12, and to create or enhance a lighting design or effect.

In the example embodiment of FIGS. 1, 2, 3*a* and 3*b*, the primary light emitting surface 12*a* of the light diffusion panel 12 has a generally rectangular shape, with the long or lengthwise dimension L, and the short or widthwise dimension W discussed above. In other examples, the primary light emitting surface of the light diffusion panel may have other suitable shapes including, but not limited to square, wavy, zig-zag, arched or curved shapes.

The light diffusion panel 12 may be made of any suitable light diffusing material and may be transparent or partially transparent. In certain examples, the light diffusion panel 12 is made of an acrylic material. In other examples, the light diffusion panel 12 may be made of other suitable materials that are sufficiently rigid and that can receive, diffuse and emit light from an LED source including, but not limited to a light-diffusing polycarbonate, glass, ceramic, polymer or the like. In certain examples, the light diffusion panel 12 may be colorless, or may be frosted. In certain examples, the light diffusion panel 12 may have a color.

In particular examples, the light diffusion panel 12 is made of a single, solid, unitary piece of light diffusing material that is cut, machined, molded or otherwise formed into a panel shape with two primary panel surfaces having dimensions L and W (or other suitable shapes and dimensions) as described herein. A single-piece structure of the light diffusion panel 12 can help to simplify the manufacture and assembly of the lighting device module 10. However, in other examples, the light diffusion panel 12 may be made in multiple pieces or multiple layers. The light diffusion panel 12 has a thickness dimension T that is suitable for accommodating grooves as described herein.

As shown in FIGS. 3*a* and 3*b*, each of the two edges that define the width dimension W of the light diffusion panel 12 is cut or otherwise formed at a 45-degree angle (and in the same angle orientation) relative to the plane of the primary light emitting surface 12*a*. In other examples, the width-wise W edges may be cut or otherwise formed at other oblique angles relative to the plane of the primary light emitting surface 12*a*. In other examples, one or both of the lengthwise L edges may be formed at an oblique angle, in addition to or as an alternative to the width-wise W edges being formed at an oblique angle.

As described herein, two or more lighting device modules 10 may be arranged (and, in some examples, connected together) with oblique-angled edges of their light diffusion panels 12 being directly adjacent and facing each other (or abutting each other), and with the plane of the facing edges being parallel. In that arrangement, the angled edges of adjacent light diffusion panels overlap each other and can emit light to avoid or minimize any visible gap in light emission between adjacent lighting device modules 10 in the system.

Figure 4A:
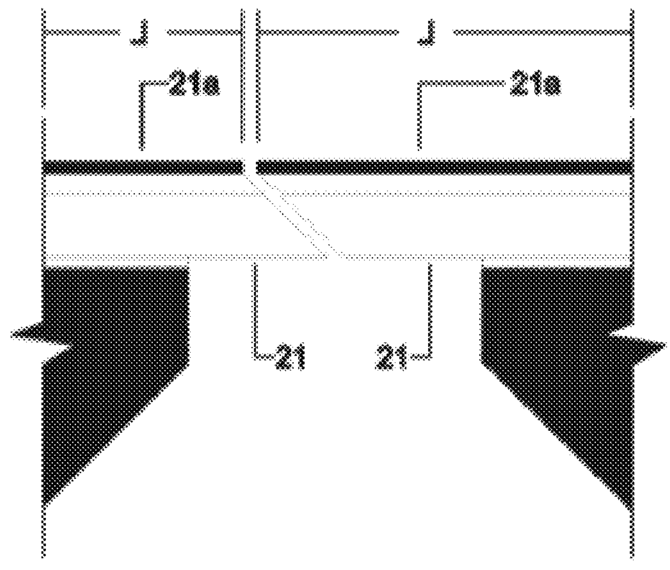
FIGS. 4*a*, 4*b* and 4*c* are side views of the end portions of two light diffusion panels of two respective lighting device modules in FIGS. 1 and 2.
Figure 4B:
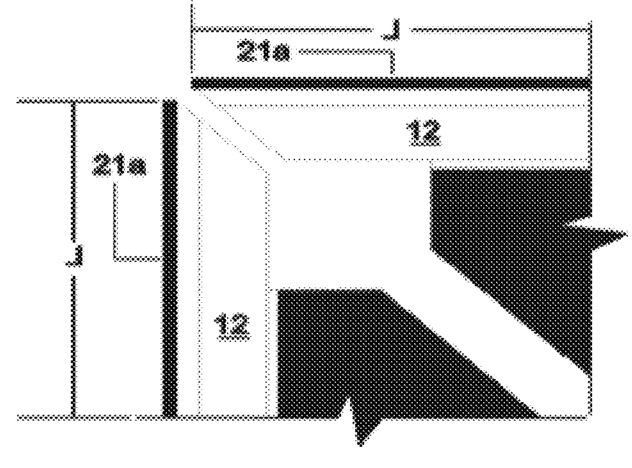

In particular examples, the light diffusion panel 12 of the lighting device module 10 may be symmetrical in shape, across an axis A along the length dimension L. Accordingly, in a lighting system, two lighting device modules 10*a* and 10*b* may be arranged adjacent each other with their angled edges parallel to each other, and their respective length dimensions L in linear alignment, as shown in FIG. 4*a*. Alternatively, one of the two lighting device modules may be rotated 180 degrees and a lighting system may have the same two lighting device modules 10*a* and 10*b* arranged adjacent each other, but with their respective length dimensions L arranged at an angle (a right angle, where the oblique edge angle is 45 degrees), as shown in FIG. 4*b* or in FIG. 4*c*.

As mentioned above, the primary light emitting surface (i.e., the upward-facing surface 12*a* in FIGS. 1 and 2) of the light diffusion panel 12 includes a groove or channel 12*c*. The channel 12*c* may be formed in the surface 12*a* by any suitable manufacturing method including, but not limited to cutting, etching, molding, combinations thereof, or the like. The channel 12*c* does not extend all of the way through the thickness dimension T of the light diffusion panel 12, but is sufficiently deep to receive at least a portion of (or the entire) width dimension of the LED strip light 14, as described herein. In other examples, at least a portion of the channel 12*c* may extend all of the way through the thickness dimension T of the light diffusion panel 12.

The channel 12*c* defines an outer wall surface 12*c*' closest to the peripheral edge of the light diffusion panel 12. When assembled, the LED strip light 14 is received in the channel 12*c*, in an orientation such that the emitting side of the LED elements on the LED strip light 14 face outward, toward the surface 12*c*' of the channel 12*c*. In some examples, the LED strip light 14 may be adhered to the outer wall surface 12*c*' of the channel 12*c*. The LED elements may be energized to emit light into the light diffusion panel 12, through the outer wall 12*c*' of the channel 12*c*. In particular examples, the light diffusion panel 12 diffuses light emitted from the LED elements and provides a generally uniform appearing light emission over the section of the primary light emitting surface 12*a* between the outer edge 12*c*' of the channel 12 and the outer peripheral edges (the widthwise W and lengthwise L edges) of the light diffusion panel 12.

The LED strip light 14 may be any suitable LED strip light commercially available or custom made including, but not limited to the LED strip lights offered by General Electric™, Philips™, Feit Electric™, EcoSmart™, or other suitable sources. The LED strip light 14 may be a typical LED strip light having a flexible ribbon or tape having a plurality of LED elements in one or more rows along the length of the ribbon or tape which, when energized, emit light from one side of the ribbon or tape (i.e., the light-emission side of the LED lighting strip). In some examples, the LED strip light 14 may include one or more rows of LED elements having a first color or temperature and another one or more rows of LED elements having a second color or temperature different from the first color or temperature, connected to be separately controllable.

In the example in FIG. 3*a*, the path of the channel 12*c* has a generally rectangular shape with rounded corners, extends around the entire surface 12*a*, and is spaced within the outer peripheral edges of the surface 12*a*. The path of the channel 12*c* defines a rectangular ring that encircles one or more fastener openings 12*d* in the panel 12 (five fastener openings 12*d* are shown in FIGS. 3*a* and 3*b*). The generally rectangular shape of the channel path includes sections that extend along and are parallel to the panel edges that define the L and W dimensions of the light diffusing panel 12. In other examples, the channel 12*c* may have other suitable shapes or may extend partially, but not fully around the surface 12*a* of the light diffusion panel 12.

The surface 12*a* of the light diffusion panel 12 may also include a connector channel 12*e* that extends from the main channel 12*c* to an opening 12*f* that extends completely through the light diffusion panel 12. The connector channel 12*e* and the opening 12*f* provide a pathway for electrical wiring that connects the LED lighting strip 14 with the electronics component 18 as described herein. In other examples, the connector channel 12*e* may be omitted and the opening 12*f* may extend directly from and into the main channel 12*c*. In examples in which the main channel 12*c* is provided in the primary surface 12*b* (instead of the primary light emitting surface 12*a*), the connector channel 12*e* and the opening 12*f* may be omitted.

In the example in FIG. 2, the electronics housing 16 has a generally rectangular-box shape that is open on one side (the downward-facing side in FIG. 2). In other examples, the electronics housing may have other suitable shapes and configurations. The electronics housing 16 may be made of any suitable material including, but not limited to a sheet metal material, plastic, ceramic, wood, or a combination thereof.

In the example in FIG. 2, the wall of the housing 16 defining the wall surface 16*a* includes one or more openings 16*b* (five openings shown in FIG. 2) that align with the fastener openings 12*d* in the light diffusion panel 12, and through which one or more fasteners 24 may extend to connect the light diffusion panel 12 and the cover panel 22 with the electronics housing 16, as described below. In other examples, the openings 16*b* in the housing 16 and the openings 12*d* in the light diffusion panel 12 may be omitted, and another suitable connection mechanism may be used to couple the housing 16, the light diffusion panel 12 and the cover panel 22 together such as, but not limited to, clamps, adhesives, friction fitting components, combinations thereof, or the like.

Figures 5A, 5B:
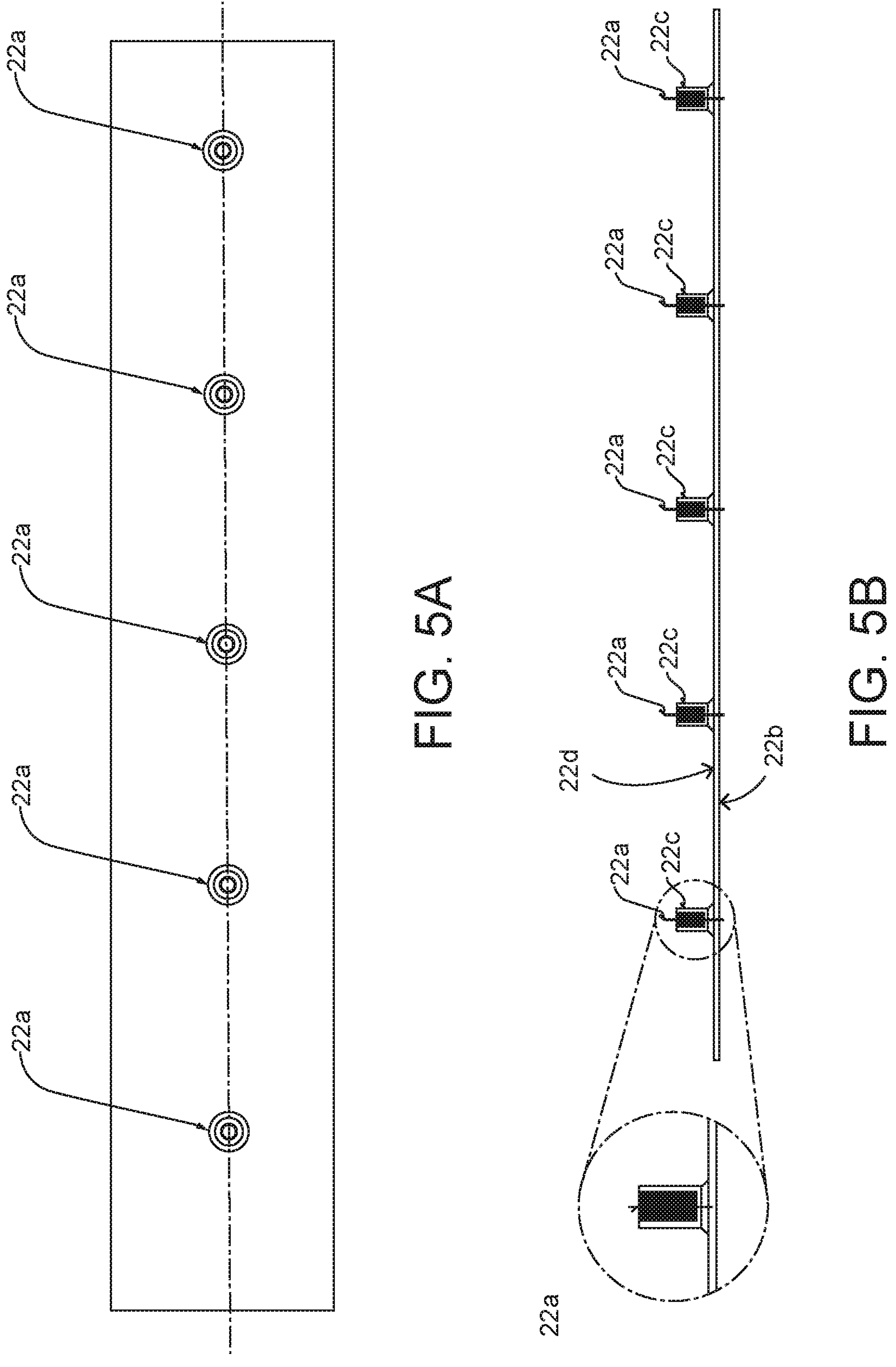
FIG. 5*a* is a top-down view of a cover panel of the lighting device module of FIGS. 1 and 2.
FIG. 5*b* is a cross-section view of the cover panel of FIG. 5*a*, taken along the axis A.

An example of the cover panel 22 of the lighting device module 10 is shown in FIGS. 5*a* and 5*b*. More specifically, FIG. 5*a* shows the bottom surface of the cover panel 22 (i.e., the surface facing downward in FIGS. 1 and 2). FIG. 5*b* shows a cross-section view of the cover panel 22.

In the example embodiment of FIGS. 1, 2, 5*a* and 5*b*, the cover panel 22 has a generally rectangular shape, corresponding to, but smaller in L and W dimensions than the shape of the light emitting surface 12*a* of the light diffusion panel 12. In other examples, the cover panel may have other suitable shapes including, but not limited to square, wavy, zig-zag, arched or curved shapes. The cover panel 22 may be made of any suitable material including, but not limited to metal, plastic, ceramic, wood, combinations thereof, or the like. In certain examples, the cover panel may be colored black to enhance the visual effect of light emitted from the section of the primary light emitting surface 12*a* that is not covered by the cover panel 22. In other examples, the outward-facing surface of the cover panel may have other colors, visual designs, text or other indicia, or the like.

In certain examples, the cover panel 22 may include one or more connection features that engage and connect with one or more corresponding fasteners, to connect together the cover panel 22, the light diffusion panel 12 and the electronics housing 16. In the example in FIGS. 5*a* and 5*b*, the connection features include a plurality of threaded openings 22*a* for receiving threaded fasteners 24 such as, but not limited to bolts, screws, or the like. In other examples, other suitable connection mechanisms may be used, as described herein.

As shown in FIG. 2, a plurality of bolts or other threaded fasteners 24 are configured to extend through the openings 16*b* in the wall 16*a* of the housing 16 and into or through the openings 12*d* in the light diffusion panel 12. The bolts or other threaded fasteners 24 are configured to engage and thread with threaded openings 22*a* in the cover panel 22.

In the example in FIGS. 1 and 2, the threaded openings 22*a* in the cover panel 22 do not extend completely through the cover panel 22, such that the threaded openings 22*a* are hidden from view in the assembled lighting device module 10. In that example, the outward-facing surface 22*b* of the cover panel 22 may be smooth or otherwise artistically contoured. However, in other examples, the threaded openings 22*a* may extend all the way through the cover panel 22. In yet other examples, other suitable arrangements of threaded fasteners, clamps, adhesive materials, combinations thereof, or other coupling mechanisms may be employed in addition to or as an alternative to the fasteners 24.

In the example in FIGS. 1 and 2, the threaded openings 22*a* are provided in protruding projections 22*c* that extend from the back surface 22*d* of the cover panel 22. The back surface 22*d* faces opposite of the outward-facing surface 22*b* of the cover panel 22. In that example, the projections may extend into the openings 12*a* of the light diffusion panel 12, and either partially or completely through the light diffusion panel 12, when the lighting device module 10 is assembled as shown in FIG. 1.

The projections 22*c* allow the cover panel to be made relatively thin over the rest of the panel, while providing a sufficient length of threads in the threaded openings 22*a* to enable a strong coupling with the threaded fasteners 24. However, in other examples, the projections 22*c* may be omitted and the threaded openings 22*a* may be provided in or through the panel thickness dimension. In yet other examples, the openings 22*a* are not threaded and, instead, a threaded nut or other portion of the fastener may engage and couple to the threaded fasteners 24 over the outward-facing surface 22*b* of the cover panel 22.

The electronic component 18 includes driver electronics configured to connect with an external power source (such as, but not limited to a 110V AC wall outlet, power supply or the like) and provide suitable electrical power to energize the LED strip light. In some examples, the electronics component 18 may include an AC to DC converter to provide DC current to the LED strip light.

The electronics component 18 includes one or more electrical wires or other conductors 18*a* that electrically connect with the LED strip light 14. The electrical wires or other conductors 18*a* may extend through an opening 16*c* in the wall 16*a* of the electronics housing 16, and through the opening 12*f* in the light diffusion panel 12, to connect to the LED light strip 14. The electronics component 18 also includes one or more electrical wires or conductors 18*b* (such as a power cord or cable) that has a plug connector or other connector (not shown) configured to plug into a standard wall outlet socket or to connect to another suitable power source.

The electronics component 18 or one of the conductors 18*a* and 18*b* may include an electrical switch that is accessible to a user, to control the on-off operation (or other operations) of the LED light strip 14 in the lighting device module (or in a plurality of lighting device modules connected in a lighting system as described herein). In some examples, the electronics component 18 includes receiver electronics configured to receive a wireless signal from a wireless remote controller (not shown) to control the on-off operation (or other operations) of the LED light strip(s) 14.

The electronics component 18 is shown in FIG. 2 as having a single housing containing electronic circuitry and devices for driving the LED light strip 14. In other examples, the electronics component 18 may include multiple housings or devices. The electronics component 18 is configured to be entirely received and contained within the electronics housing 16. In other examples, the electronics component 18 is partially received in the housing 16. The electronics component 18 may be secured to and held by the housing 16 by any suitable securing mechanism (not shown) such as, but not limited to threaded fasteners, clamps, adhesives, friction fitting, combinations thereof or the like.

The bracket assembly 20 may be any suitable structure that enables or assists in the mounting of an assembled lighting device module 10 to a support structure such as, but not limited to a wall or other flat surface, a fence, door molding, window molding, a post, a pole, combinations thereof, or the like. In the example in FIG. 2, the bracket assembly 20 includes multiple components that connect and operate together to provide adjustability of the length of an assembled bracket and adjustability in the position of mounting holes in the assembled bracket. In certain examples, the length of the bracket assembly 20 may be adjusted to accommodate a full-length, uncut lighting device module 10, as well as a lighting device module 10 that has been cut in length L. In other examples, the bracket assembly may be configured to have a fixed length dimension and is not adjustable.

In the example in FIG. 2, the bracket assembly 20 includes two U-shaped brackets 20*a* and 20*b* and two elongated brackets 20*c* and 20*d*, as well as a mount washer 20*e* and threaded fasteners 20*f*-201. The U-shaped brackets 20*a* and 20*b* and the elongated brackets 20*c* and 20*d* may be made of any suitably rigid material such as, but not limited to metal, plastic, wood, ceramic, combinations thereof, or the like.

The U-shaped brackets 20*a* and 20*b* may be configured to be secured to side walls of the housing 16 (e.g., the lengthwise side walls facing into and out of the page in FIG. 2). In particular examples, each of the side walls of the housing may include one or more openings through which threaded fasteners 20*f* and 20*g* may pass. In the example in FIG. 2, each of the side walls of the housing 16 has a plurality of openings, including two openings for the fasteners that connect the two respective U-shaped brackets to the side wall, and another opening to allow selection of the location of the U-shaped bracket 20*a* along the length dimension of the housing 16. Also in the example of FIG. 2, each of the openings in the side walls of the housing 16 are elongated in the length dimension of the housing, to enable further adjustability of the location of the U-shaped brackets 20*a* and 20*b* along the length dimension of the housing 16. In other examples, the side walls of the housing 16 may have other suitable arrangements and configurations of openings or other connection features to enable connection of the U-shaped brackets 20*a* and 20*b* to the housing 16.

The legs of the U-shaped brackets 20*a* and 20*b* may be configured to fit between the side walls of the housing 16 and may include threaded openings configured to receive and be threadingly engaged by the threaded fasteners 20*f*-20*i* to connect the brackets 20*a* and 20*b* to the housing 16. In other examples, the legs of the U-shaped brackets 20*a* and 20*b* may fit on the outside of one or both side walls of the housing 16. In those or other examples, the openings in the housing 16 may be threaded as an alternative to or in addition to the threading of the openings in the U-shaped brackets 20*a* and 20*b*. In yet other examples, the U-shaped brackets 20*a* and 20*b* may connect with the housing 16 by other suitable connection mechanisms such as, but not limited to other threaded fasteners, clamps, adhesives, friction fitting, combinations thereof or the like.

Each elongated bracket 20*c* and 20*d* is configured to be connected to one of the U-shaped brackets 20*a* or 20*b*, via the threaded fasteners 20*j* or 20*k*. In particular examples, the elongated brackets 20*c* and 20*d* include openings through which the threaded fasteners 20*j* and 20*k* extend. In addition, the back section of each U-shaped bracket 20*a* and 20*b* has a threaded opening that receives and threadingly engages one of the fasteners 20*j* or 20*k*, to connect the elongated brackets 20*c* and 20*d* to the U-shaped brackets 20*a* and 20*b*, respectively.

A further threaded fastener 201 is provided to extend through a slot-shaped opening in the elongated bracket 20*c* and threadingly engage with a further opening in the elongated bracket 20*d*. One or both of the elongated brackets 20*c* and 20*d* may include one or more further openings for receiving one or more fasteners (screws, bolts, or other fasteners) to mount the bracket assembly 20 to a surface of an external support structure as described herein.

In particular examples, the length of the bracket assembly 20 is adjustable by sliding the elongated brackets 20*c* and 20*d* relative to each other, in the direction of their elongated dimensions, before tightening the threaded fastener 201. Once the elongated brackets 20*c* and 20*d* are slid relative to each other to a desired overall length, the threaded fastener 201 is tightened to fix the length of the bracket assembly 20 to the adjusted length. In certain examples, the length of the bracket assembly 20 can be adjusted to accommodate different mounting surfaces or to accommodate a cut length of the lighting device module 10 as described below.

To assemble the lighting device module 10, the LED strip light 14 is received within a groove in the light diffusion panel 12. In addition, the cover panel 22 is arranged on the primary light emitting surface 12*a* of the light diffusion panel 12. In examples in which the cover panel has projections 22*c*, the projections 22*c* are received within the openings 12*b* of the light diffusion panel 12. The panel 12 is arranged on the wall 16*b* of the housing 16, and the fasteners 24 are passed through the openings 16*b* and 12*b* of the housing wall 16*a* and the light diffusion panel 12. In certain examples, the fasteners 24 engage and connect with the projections 22*c*, within the openings 12*b* of the light diffusion panel 12. The fasteners 24 are threaded into the threaded openings 12*a* in the cover panel 22, to secure the cover panel 22, the light diffusion panel 12 and the housing 16, together.

In addition, the electronics component 18 is electrically connected to the LED strip light 14, and is received fully or partially within the housing 16, through an open side of the housing (i.e., the downward-facing side in FIG. 2). The electronics component 18 may be secured to and held by the housing by any suitable securing mechanism (not shown) such as, but not limited to threaded fasteners, clamps, adhesive materials, friction fitting, combinations thereof or the like.

The elongated brackets 20*c* and 20*d* are connected to the U-shaped brackets 20*a* and 20*b* of the bracket assembly 20, by fasteners 20*j* and 20*k*. The elongated brackets 20*c* and 20*d* are connected together to define a desired length, by the fastener 201. The legs of the U-shaped brackets 20*a* and 20*b* of the bracket assembly 20 are received fully or partially within the housing 16, through the open side, and are connected and secured to side walls of the housing 16 by fasteners 20*f*-20*i*.

When the lighting device module 10 is assembled, the elongated brackets 20*c* and 20*d* of the bracket assembly 20 have holes arranged for receiving fasteners for mounting the lighting device module 10 in a suitable mounting position and location. In particular examples, the elongated brackets 20*c* and 20*d* may be mounted at the mounting position and location, before the U-shaped brackets 20*a* and 20*b* are secured to the electronics housing. In some examples, the bracket assembly 20 may be configured to mount the lighting device module 10 on a generally flat surface such as, but not limited to, a wall surface, a ceiling surface, a floor surface, a surface of a doorway molding or a window molding, a fence surface, or the like. In other examples, the bracket assembly 20 may be configured to mount the lighting device module 10 on other surfaces or structures.

In particular embodiments, a plurality of lighting device modules 10 may be assembled and arranged together, to create a lighting system having a desired lighting and visual effect. For example, two or more lighting device modules 10 may be arranged and aligned end-to-end in a lighting system, where each lighting device module 10 has one or both of its width edges W arranged directly adjacent or in contact with a width edge W of another lighting device module 10 in the system. In that manner, a pleasing and functional illuminated line effect is provided by the primary light emitting surfaces 12*a* two or more aligned lighting device modules 10 in a lighting system, where the illuminated line has a length of LN, where L is the length of the light diffuser panel in each lighting device module, and N is the number of lighting device modules in the lighting system. As described herein, one or more of the lighting device modules 10 in the lighting system may be cut to a smaller length, such that the illuminated line length LN may be reduced or increased by a fraction of the length L of a lighting device module.

In particular examples, when two or more lighting device modules 10 are arranged in a lighting system as described herein, the electronics component 18 of a designated one of the lighting device modules 10 may be electrically connected to drive the LED strip light 14 of some or each of the lighting device modules 10 in the lighting system. In those examples, wires or other electrical conductors may extend from the electronics component 18 of the designated lighting device module to some or each of the other lighting device modules in the lighting system. In certain examples, those other lighting device modules in the lighting system need not include a separate electronics component 18. In some examples, a lighting device system may include two or more lighting device modules that have their electronics component 18 connected to drive one or more other lighting device modules in the lighting system. In some examples, a plurality of lighting device modules 10 may be configured to be electrically connected to each other in a daisy-chain connection to drive the LED light strips of the plurality of modules (with each lighting device module 10 electrically connected to one or two directly adjacent lighting device modules in the lighting system).

In some examples, when two or more lighting device modules 10 are arranged in a lighting system as described, the adjacent lighting device modules 10 in the system may be connected together. For example, the electronics housings 16 of adjacent lighting device modules 10 in the system may be coupled together (through their respective end walls) by threaded fasteners or any other suitable connection mechanism including, but not limited to clamps, adhesive materials, other fasteners, combinations thereof, or the like. Alternatively or in addition, the bracket assemblies 20 or the cover panels 22 of adjacent lighting device modules 10 in the system may be coupled together by such connection mechanisms.

In particular examples, each lighting device module 10 is configured to eliminate or minimize any gap in the illumination effect (e.g., in the line of light) provided by a plurality of aligned lighting device modules in a lighting system. As described herein, the light diffusion panel 12 of each lighting device module 10 in the lighting system may include one, two, or more edges that are cut or formed at an oblique angle, and each module may be arranged such that the angled edge overlaps (or is overlapped by) an angled edge of the light diffusion panel of an adjacent lighting device module in the system. In that manner, the lighting system may be configured to produce an illuminated line effect (or other lighting design) having an uninterrupted length LN of light, with minimal or no gaps in the line (or other design) of light along that length dimension. While some lighting system embodiments may also include one or more gaps in the light line effect formed by adjacent lighting device modules in a lighting system, the minimization or avoidance of gaps in some (or all) of the line of light along the length LN of a lighting system can provide an improved visual effect and function.

Figure 4C:
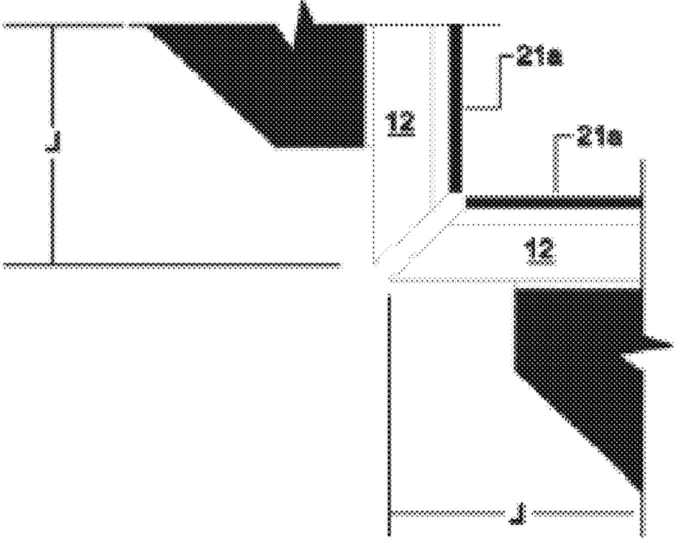

Also in particular examples, two or more lighting device modules 10 may be configured to be arranged adjacent each in the same lengthwise dimension, as shown in FIG. 4*a*, or may be arranged perpendicular to each other, as shown in FIG. 4*b* or in FIG. 4*c*. In that manner, a lighting system of a plurality of lighting device modules 10 may be configured to extend linearly, around a corner or around the edges of a doorway, a window or other structure.

In certain examples, the lighting device module 10 is configured to be easily cut in its length dimension L (or in its width dimension W, or in its length and width dimensions). In that manner, a lighting device module 10 may be cut to a size to fit into a desired mounting space or to be part of a desired lighting system design or shape. For example, a user or installer may cut each of the light diffusion panel 12, the electronics housing 16 and the cover panel 22 of a lighting device module 10 along the length dimension L, to a desired length, before assembling the lighting device module 10. In addition, the bracket assembly 20 may be adjusted in its length dimension to correspond to the cut length of the electronics housing 16, by sliding the elongated brackets 20*c* and 20*d* to form an adjusted length, before tightening the threaded fastener 201. In addition, the cut edge of the light diffusion panel 12 may be cut in an oblique angle, as described herein. The user or installer may use standard metal cutting blades or saws for making the desired cuts.

In particular examples, lighting device modules 10 are configured to be manufactured in a single size having the dimensions L and W, or in a minimal number of different lengths L, to minimize manufacturing costs. In those examples, the length L (or each length L) may be selected to maximize the number of standard construction lengths or common usage lengths that correspond to (or are within one length L of) the length dimension LN (i.e., the length dimension of N lighting device modules 10 of length L). Accordingly, a lighting system having N lighting device modules may be easily assembled to extend across the standard construction length or the common usage length (while requiring minimal or no lighting device modules 10 to be cut in length L). A standard construction length may include, but is not limited to the length of a standard doorway height or width, or of a standard window height or width. A common usage length may be any length that is determined to be common to various different lighting contexts.

In examples in which the lighting device module 10 is configured to be cut in length L, a standard construction length or a common usage length may include one (or a minimum number of) lighting device modules 10 that are cut in length L aligned with one or more lighting device modules 10 in the lighting system. In certain examples, the length L is one foot. In other examples, the length L is one and a half feet, two feet, three feet or other suitable length.

The foregoing description of illustrative embodiments has been presented for purposes of illustration and of description. It is not intended to be exhaustive or limiting, and modifications and variations may be possible in light of the above teachings or may be acquired from practice of the disclosed embodiments. Various modifications and changes that come within the meaning and range of equivalency of the claims are intended to be within the scope of the invention. Thus, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A lighting system having at least one lighting device module, each lighting device module comprising:

a light diffusion panel having a primary light emitting surface and at least one side edge defining a plane at an oblique angle relative to the primary light emitting surface;

a plurality of light emitting diodes (LEDs) arranged to emit light into the light diffusion panel, for emitting light from the light emitting surface of the light diffusion panel;

wherein the light diffusion panel has a main channel in the primary light emitting surface, the main channel extending along at least a portion of, and spaced inward from, a perimeter of the light diffusion panel, and wherein the LEDs are located within the main channel and arranged to face and emit light toward at least a portion of the perimeter of the light diffusion panel.

2. The lighting system of claim 1, wherein the at least one lighting device module comprises a plurality of lighting device modules arranged with the at least one side edge of the light diffusion panel of one of the lighting device modules arranged adjacent to and overlapping the at least one side edge of the light diffusion panel of at least one other of the lighting device modules of the plurality of lighting device modules.

3. The lighting system of claim 2, wherein each lighting device has a lengthwise dimension and is configured to be arranged adjacent another one of the lighting device modules of the plurality of lighting device modules with their respective length dimensions extending in a linear line, and to be rotated 180 degrees and arranged adjacent the same other lighting device module with their respective length dimensions extending perpendicular to each other.

4. The lighting system of claim 1, wherein the oblique angle is a 45 degree angle.

5. The lighting system of claim 1, further comprising a housing fixed on a surface of the light diffusion panel opposite of the primary light emitting surface, and a bracket assembly connected to the housing for mounting the housing to a mounting surface.

6. The system of claim 5, further comprising:

one or more threaded fasteners extending through a portion of the housing and through the light diffusion panel; and a cover panel arranged to cover a portion of, but not the entire primary light emitting surface of the light diffusion panel, the cover having one or more threaded openings for receiving the one or more threaded fasteners, to couple the housing, the light diffusion panel and the cover panel together.

7. The lighting system of claim 1, wherein the light diffusion panel has an opening extending through the light diffusion panel, and wherein the lighting system further comprises at least one electrical conductor electrically coupled to the LEDs and extending through the opening in the light diffusion panel.

8. The lighting system of claim 7, wherein the light diffusion panel has a connector channel extending from the main channel to the opening.

9. A lighting system, having at least one lighting device module, each lighting device module comprising:

a light diffusion panel having a primary light emitting surface and at least one side edge defining a plane at an oblique angle relative to the primary light emitting surface;

a plurality of light emitting diodes (LEDs) arranged to emit light into the light diffusion panel, for emitting light from the light emitting surface of the light diffusion panel;

wherein the light diffusion panel has a channel in which the plurality of LEDs are received, the channel in the light diffusion panel being fully spaced inward from each of the at least one side edge of the light diffusion panel.

10. The lighting system of claim 9, wherein the channel has an outer wall and wherein the plurality of LEDs are arranged to face and emit light into the outer wall of the channel.

11. The lighting system of claim 10, further comprising a cover panel arranged to cover a portion of, but not the entire primary light emitting surface of the light diffusion panel, wherein the cover panel covers the channel in the light diffusion panel.

12. The lighting system of claim 9, wherein the at least one lighting device module comprises a plurality of lighting device modules;

and wherein the plurality of lighting device modules are arranged adjacent each other, with at least one of the two side edge surfaces of the light diffusion panel of each lighting device module arranged adjacent to and overlapping one of the two side edge surfaces of the light diffusion panel of another one of the lighting device modules in the plurality of lighting device modules.

13. The lighting system of claim 12, wherein the light diffusion panel of each lighting device module has a generally rectangular shape defining a lengthwise dimension and a widthwise dimension, and wherein the side edge surfaces defining the oblique angle extend along the widthwise dimension.

14. The lighting system of claim 13, wherein each lighting device module is arranged adjacent one or two of the other lighting device modules of the plurality of lighting device modules with each of their respective length dimensions extending in a linear line, and to be rotated 180 degrees and arranged adjacent the same one or two other lighting device modules with its length dimensions extending perpendicular to the length dimension of the one or two other lighting device modules.

15. The lighting system of claim 9, wherein:

the plurality of LEDs are on an LED strip light;

and the channel in the light diffusion panel has an outer wall that is not parallel to the light emitting surface of the light diffusion panel, and wherein the plurality of LEDs on the LED strip light are arranged to face and emit light into the outer wall of the channel.

16. The lighting system of claim 15, further comprising a cover panel arranged to cover a portion of, but not the entire primary light emitting surface of the light diffusion panel, wherein the cover panel covers the channel in the light diffusion panel.

17. The lighting system of claim 15, wherein the light diffusion panel comprises a single, unitary piece of light diffusion material in which the channel has been formed.

18. The lighting system of claim 9, wherein the light diffusion panel comprises a single, unitary piece of light diffusion material in which the channel has been formed.

19. A lighting system having at least one lighting device module, each lighting device module comprising:

a light diffusion panel having a primary light emitting surface and at least one side edge defining a plane at an oblique angle relative to the primary light emitting surface;

a plurality of light emitting diodes (LEDs) arranged to emit light into the light diffusion panel, for emitting light from the light emitting surface of the light diffusion panel;

one or more threaded fasteners extending through a portion of the housing and through the light diffusion panel; and a housing on a surface of the light diffusion panel opposite of the primary light emitting surface, and a bracket assembly connected to the housing for mounting the housing to a mounting surface; and a cover panel arranged to cover a portion of, but not the entire primary light emitting surface of the light diffusion panel, the cover having one or more threaded openings for receiving the one or more threaded fasteners, to couple the housing, the light diffusion panel and the cover panel together;

wherein the cover panel includes one or more projections corresponding in number to the one or more threaded openings, wherein each respective threaded opening is in a respective one of the projections.

20. The system of claim 19, wherein each of the projections extends at least partially into a respective opening in the light diffusion panel.

* * * * *